United States Patent
Doshi et al.

(10) Patent No.: US 10,795,585 B2
(45) Date of Patent: Oct. 6, 2020

(54) NONVOLATILE MEMORY STORE SUPPRESION

(71) Applicant: Intel Corporation, Santa Clara, CA (US)

(72) Inventors: Kshitij Doshi, Tempe, AZ (US); Bhanu Shankar, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/015,517

(22) Filed: Jun. 22, 2018

(65) Prior Publication Data
US 2019/0042108 A1 Feb. 7, 2019

(51) Int. Cl.
*G06F 3/06* (2006.01)
*G06F 12/08* (2016.01)

(52) U.S. Cl.
CPC .......... *G06F 3/0616* (2013.01); *G06F 3/0611* (2013.01); *G06F 3/0625* (2013.01); *G06F 3/0659* (2013.01); *G06F 3/0673* (2013.01); *G06F 3/0679* (2013.01); *G06F 12/08* (2013.01); *G06F 3/067* (2013.01)

(58) Field of Classification Search
None
See application file for complete search history.

(56) References Cited

U.S. PATENT DOCUMENTS

| 8,127,083 B2* | 2/2012 | Kundinger .......... G06F 12/0833 711/124 |
| 2004/0128281 A1* | 7/2004 | Terazono ................ G06F 8/65 |
| 2011/0181756 A1* | 7/2011 | Kazami ............. H04N 5/23245 348/231.99 |
| 2014/0047261 A1* | 2/2014 | Patiejunas ............ G06F 1/3268 713/330 |

OTHER PUBLICATIONS

Dusser et al., "Zero-Content Augmented Caches", 23rd International Conference on Supercomputing, ACM, 2009, 11 pages.
Lepak et al., "On the value locality of store instructions", pharm. ece.wisc.edu/talks/isca2k.pdf, Jun. 13, 2000, 31 pages.
Lepak et al., "On the value locality of store instructions", ISCA, 2000, pp. 182-191.
Bell et al., "Characterization of silent stores", PACT, 2000, 10 pages.

* cited by examiner

*Primary Examiner* — Brian R Peugh
(74) *Attorney, Agent, or Firm* — Jordan IP Law, LLC

(57) ABSTRACT

An embodiment of a semiconductor apparatus may include technology to determine if a memory operation on a memory is avoidable, and suppress the memory operation if the memory operation is determined to be avoidable. Other embodiments are disclosed and claimed.

17 Claims, 5 Drawing Sheets

NONVOLATILE MEMORY STORE SUPPRESION

TECHNICAL FIELD

Embodiments generally relate to memory systems. More particularly, embodiments relate to nonvolatile memory (NVM) store suppression.

BACKGROUND

Memory devices may include volatile memory media and/or NVM media. For some memory media, write operations may take more time and/or consume more energy as compared to read operations. Some NVM media may have a limited number of write operations that can be performed on each location.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with nonvolatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
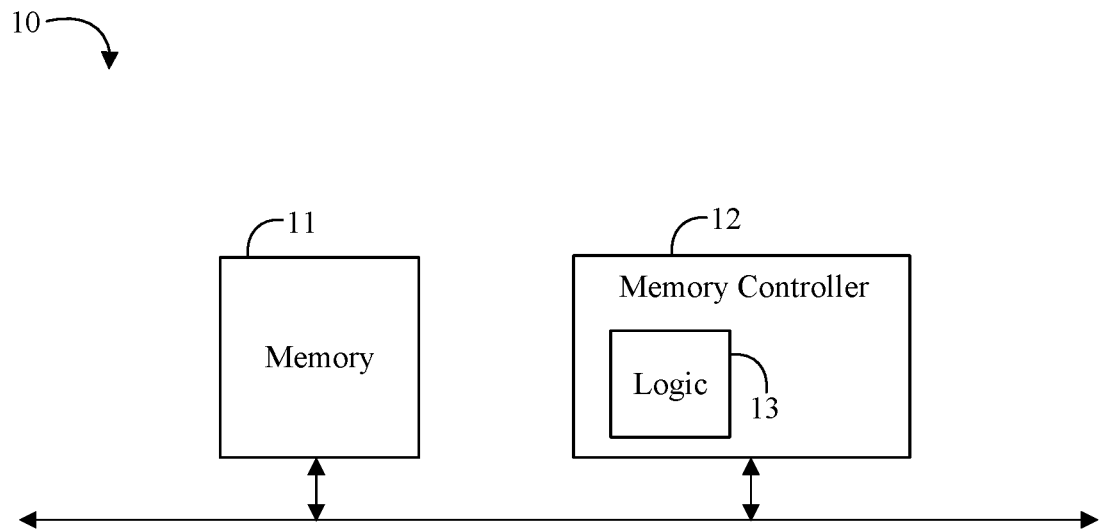
FIG. 1 is a block diagram of an example of an electronic processing system according to an embodiment.

Turning now to FIG. 1, an embodiment of an electronic processing system 10 may include memory 11 and a memory controller 12 communicatively coupled to the memory 11. In some embodiments, the memory controller 12 may include logic 13 to determine if a memory operation on the memory 11 is avoidable, and suppress the memory operation if the memory operation is determined to be avoidable. For example, the logic 13 may be configured to determine if the memory operation is avoidable based on whether a write operation modifies a content of the memory 11. In some embodiments, the logic 13 may be further configured to read an original content of a cacheline from the memory 11, in response to a request for a cacheline write operation, compare the original content against a current content of the cacheline, and suppress the cacheline write operation if the original content matches the current content. In some embodiments, the logic 13 may also be configured to collect information related to silent store operations, and report the information related to silent store operations. For example, the logic 13 may be configured to record clock durations and data addresses corresponding to silent store operations. In any of the embodiments herein, the memory 11 may include NVM. In some embodiments, the logic 13 may be located in, or co-located with, various components, including the memory controller 12 (e.g., on a same die).

Embodiments of each of the above memory 11, memory controller 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the memory controller 12 may include a general purpose controller, a special purpose controller (e.g., a NVM controller), a microcontroller, a processor, a central processor unit (CPU), a micro-processor, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 11, persistent storage media, or other system memory may store a set of instructions which when executed by the memory controller 12 cause the system 10 to implement one or more components, features, or aspects of the system 10 (e.g., the logic 13, determining if the memory operation is avoidable, suppressing the memory operation, etc.).

Figure 2:
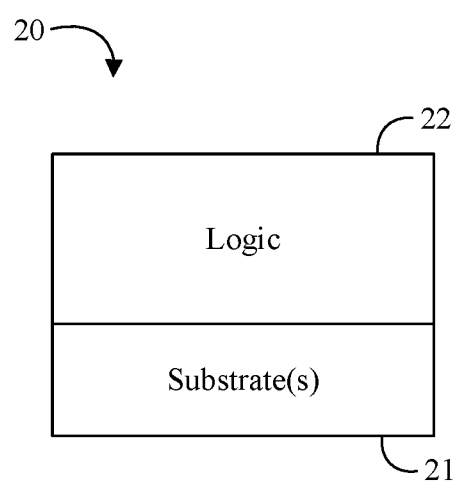
FIG. 2 is a block diagram of an example of a semiconductor apparatus according to an embodiment.

Turning now to FIG. 2, an embodiment of a semiconductor apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine if a memory operation on a memory is avoidable, and suppress the memory operation if the memory operation is determined to be avoidable. For example, the logic 22 may be configured to determine if the memory operation is avoidable based on whether a write operation modifies a content of the memory. In some embodiments, the logic 22 may be further configured to read an original content of a cacheline from the memory, in response to a request for a cacheline write operation, compare the original content against a current content of the cacheline, and suppress the cacheline write operation if the original content matches the current content. In some embodiments, the logic 22 may also be configured to collect information related to silent store operations, and report the information related to silent store operations. For example, the logic 22 may be configured to record clock durations and data addresses corresponding to silent store operations. In any of the embodiments herein, the memory may include NVM. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 26 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
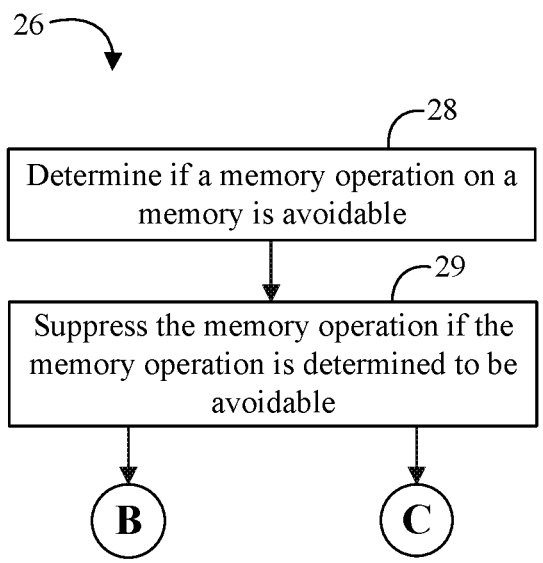
FIGS. 3A to 3C are flowcharts of an example of a method of controlling memory according to an embodiment.
Figure 3B:
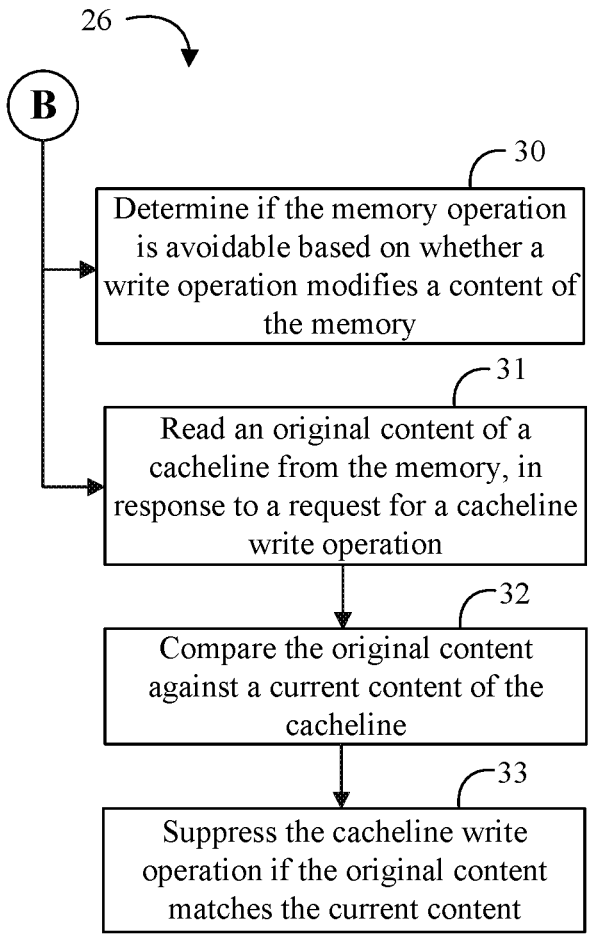
Figure 3C:
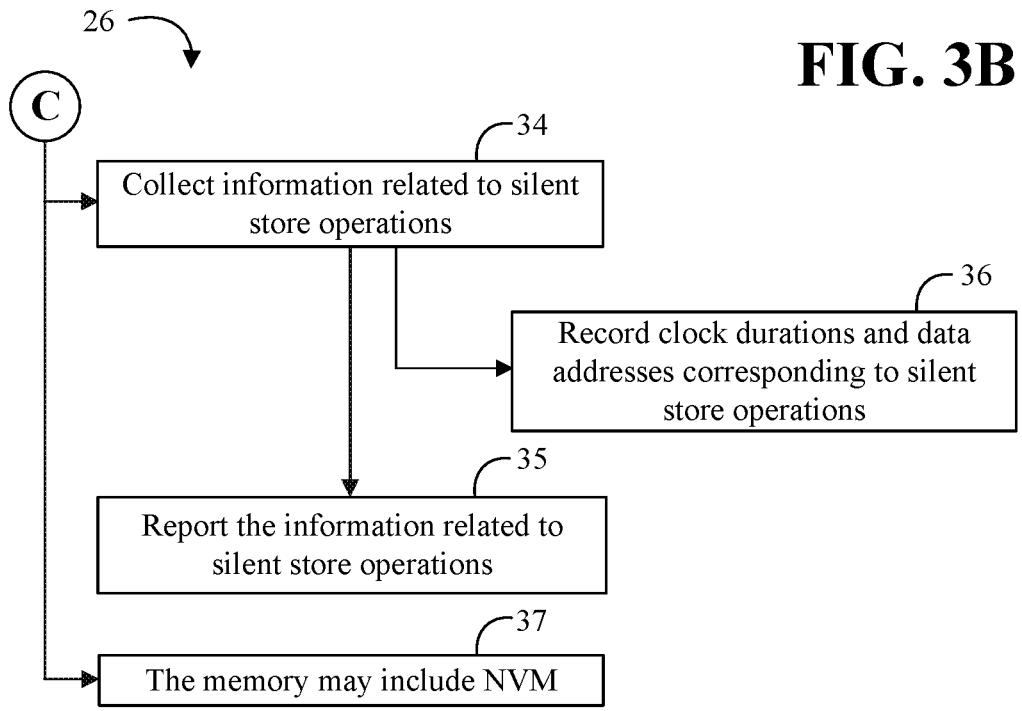

Turning now to FIGS. 3A to 3C, an embodiment of a method 26 of controlling memory may include determining if a memory operation on a memory is avoidable at block 28, and suppressing the memory operation if the memory operation is determined to be avoidable at block 29. For example, the method 26 may include determining if the memory operation is avoidable based on whether a write operation modifies a content of the memory at block 30. At block 31, some embodiments of the method 26 may further include reading an original content of a cacheline from the memory, in response to a request for a cacheline write operation. The method 26 may further include comparing the original content against a current content of the cacheline at block 32, and suppressing the cacheline write operation if the original content matches the current content at block 33. Some embodiments of the method 26 may also include collecting information related to silent store operations at block 34, and reporting the information related to silent store operations at block 35. For example, the method 26 may include recording clock durations and data addresses corresponding to silent store operations at block 36. In any embodiments of the method 26, the memory may include NVM at block 37.

Embodiments of the method 26 may be implemented in a system, apparatus, computer, device, etc., for example, such as those described herein. More particularly, hardware implementations of the method 26 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 26 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 26 may be implemented on a computer readable medium as described in connection with Examples 20 to 25 below. Embodiments or portions of the method 26 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for store suppression and reduction in NVM operations. Silent stores may refer to memory operations that tend to write a value to a location that is not different from the value in the location. For example, some silent stores may be due to idiomatic behaviors such as reinitializing buffers with static patterns, setting or clearing flags through cascaded switch statements, writing 0 (or 1) multiple times to the same item because of cascaded condition evaluations, adding/subtracting 0 or multiplying by 1, etc. In some applications, a significant number of memory operations may correspond to silent stores. Some embodiments may advantageously suppress memory operations that are avoidable. For example, some embodiments may suppress write operations that do not actually modify the contents of the memory. Advantageously, some embodiments may improve memory performance, reduce memory power consumption, and/or increase the lifetime of the memory device (e.g., particularly for NVM media).

Some other technology related to silent stores may focus on CPU performance or program performance. On-the-fly memory deduplication technology may be more hardware intensive and may have the potential of interfering with high speed paths. Compiler based (e.g., or binary retranslation based) removal of silent stores may not always effective. Many other systems may not do anything to suppress non-modifying stores. Some embodiments may advantageously suppress non-modifying stores to reduce the number of memory/write operations. For some NVM media, any write operation to the NVM may result in a heavy weight operation on the memory module in terms of performance, media endurance, and energy. For any cacheline that is written back, for example, conventionally a fairly heavy read-modify-write protocol may be followed, which may cause more than a single cacheline to be written. A conventional cache write back operation may also cause change to adjacent locations because of differences in granularities between CPU caches and NVM media blocks. When a cacheline being written back reaches the NVM controller, some embodiments of a controller may advantageously perform a pattern match against the original contents of the cacheline (e.g., at its current location in the NVM medium). In some embodiments, if there is no difference the write operation may be immediately completed without doing any further work.

From the algorithmic view, the operation that occurs may correspond to X=value. For a conventional write operation to NVM media, the controller may fetch contents to a buffer and always perform the write operation to set X=value. The controller may then mark the buffer as modified. Advantageously, some embodiments may improve the write operation to NVM media as represented in the following pseudocode (where NOP corresponds to 'no operation'):

```
Controller fetches contents to a buffer
If (X == value) {
    NOP;
} else {
    X = value
    Buffer marked as modified
}
```

Some embodiments may advantageously reduce the amount of work performed, if the value being written does not physically modify the location (e.g., if the value being written is the same as the value already present). A common operation when memory is allocated, is to initialize the memory. For example, zero (0) is a common initial value. When dealing with large memory allocations, an OS such as LINUX may have a concept of a zero page, which is utilized until the physical location is written to. While such an operation may seem to be limited in scope, considering the fact that an NVM device may have a limited write endurance, the implementation of some embodiments may increase the lifetime of the NVM device.

Some embodiments may be particularly useful for NVM media (e.g., NAND-based NVM, PCM such as INTEL 3D)(POINT, etc.), which may be included in intelligent devices with asymmetric performance, power, and/or endurance characteristics. Some embodiments may provide significant benefits by checking for modification of the NVM contents before writing a cacheline. For example, many operations that issue multi-cacheline writes may not actually change data due to design and coding patterns. As shown in the above pseudo-code, when the write operation 'X←value' is processed by an NVM controller, the controller first checks if the value being written is the same as the existing value. If the value is the same, then the NVM block is not updated. In accordance with some embodiments, the positive effect of this check may be multifold. For example, the buffer line is not marked as modified, which may result in lower pressure on the internal buffers. Additionally, the check may reduce pressure on the write pipeline and the wear-leveling management layer during both normal operating mode, and catastrophic failure of the system. The effect on the latter may be more important because it may also affect the system design and cost.

Figure 4:
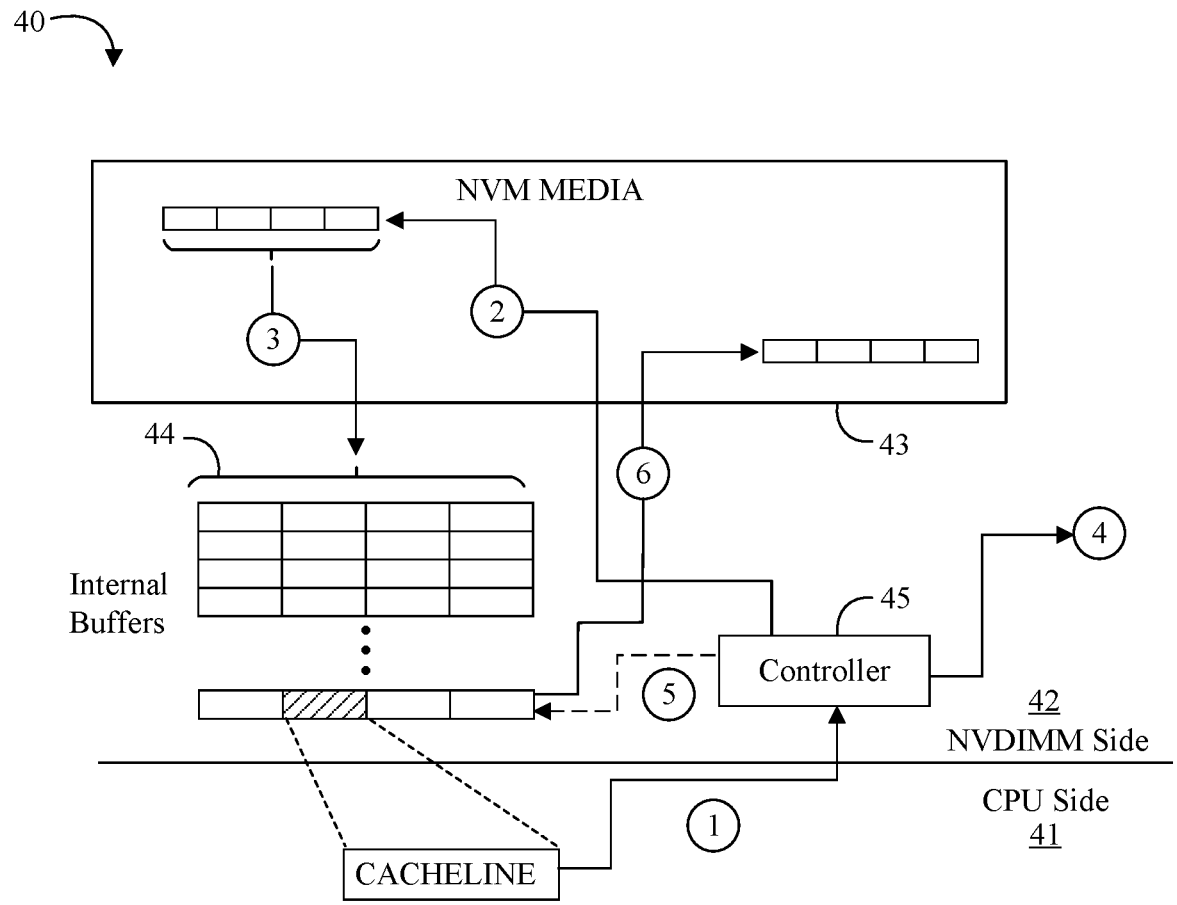
FIG. 4 is a block diagram of another example of an electronic processing system according to an embodiment.

Turning now to FIG. 4, an embodiment of an electronic processing system 40 may include a CPU side 41 and a nonvolatile dual-inline memory module (NVDIMM) side 42 (e.g., a processor/CPU communicatively coupled to one or more NVDIMMs). The NVDIMM side 42 may include NVM media 43 communicatively coupled to internal buffers 44 and a controller 45. When the controller 45 receives a write to memory operation, a series of further operations may follow. If the location is not available in the internal buffers 44, the controller 45 may generate a series of operations, by which the contents of the address being written into is brought into the internal buffers 44. The memory location may be modified and the controller 45 may track the NVM block as 'modified'. In due time, the contents of the NVM block is written into the physical NVM media 43 with due consideration given to wear-leveling. The series of operations may account for the characteristics of memory technology (e.g., cacheline size may be smaller than the block-line addressable nonvolatile RAM).

Advantageously, some embodiments of the controller 45 may include technology to determine if a memory operation on the NVM media 43 is avoidable, and suppress the memory operation if the memory operation is determined to be avoidable. For example, the controller 45 may be configured to determine if the write operation is avoidable based on whether the write operation modifies a content of the NVM media 43. In some embodiments, the controller 45 may be configured to read an original content of a cacheline from the NVM media 43, in response to the write operation. The controller 45 may then compare the original content against a current content of the cacheline, and suppress the write operation if the original content matches the current content. In some embodiments, the controller 45 may also be configured to collect information related to silent store operations, and report the information related to silent store operations. For example, the controller 45 may be configured to record clock durations and data addresses corresponding to silent store operations.

An example process flow may be better understood with reference to the circled numbers in FIG. 4. At number 1, the CPU side 41 may flush a cacheline to the NVDIMM side 42. At numbers 2 and 3, the controller 45 may fetch the corresponding NVM block to the internal buffers 44. The controller 45 may then compare the current content of the cacheline from the CPU request to the original content of the fetched NVM block. At number 4, the controller 45 may immediately complete the write operation without doing any further work (e.g., NOP) if the original and current cacheline contents match. Otherwise, at number 5 the cacheline may be replaced the internal buffers 44. At number 6, the NVM block is eventually written back to the NVM media 43 in a different location (e.g., after which the write operation is complete).

Advantageously, by suppressing the write operation at number 4, some embodiments may improve the endurance, the performance, and/or the power usage of the NVDIMM side 42. In particular, some embodiments may provide a reduction in the consumed power to maintain the state of memory. For example, in some systems each write of a cacheline to NVM may cause the adjacent lines to be written as well. Eliminating the non-modifying writes advantageously reduces the use of energy, and the total cost of operation may also be reduced. Some embodiments may provide increased perceived performance. For example, the elimination of the slow operations at the device level may reduce the queue depth of pending operations and may also decrease the latency of operations performed by the device. Some embodiments may provide increased lifetime of the NVM device. NVM media may have a rated number of write operations that can be performed on each and every location. By eliminating a portion of write operations every day, the lifetime of the NVM device may advantageously be increased.

Figure 5A:
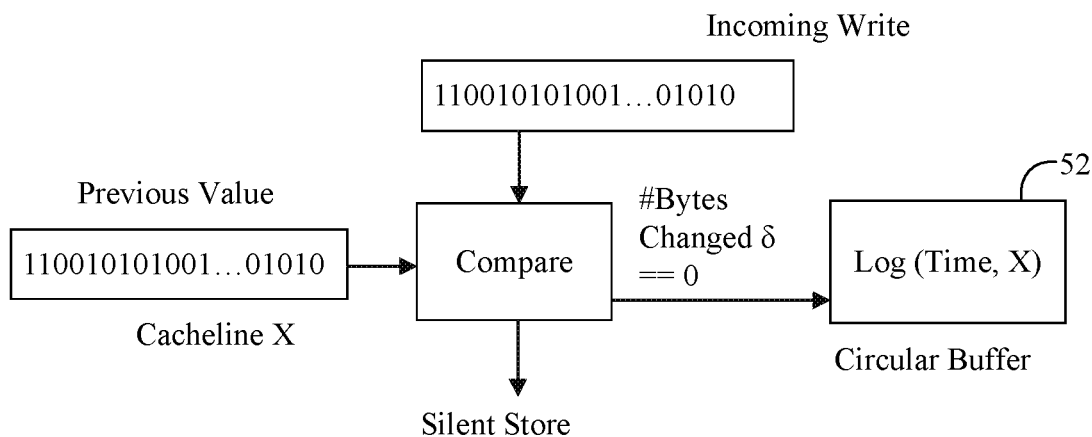
FIGS. 5A to 5B are block diagrams of another example of an electronic processing system according to an embodiment.
Figure 5B:
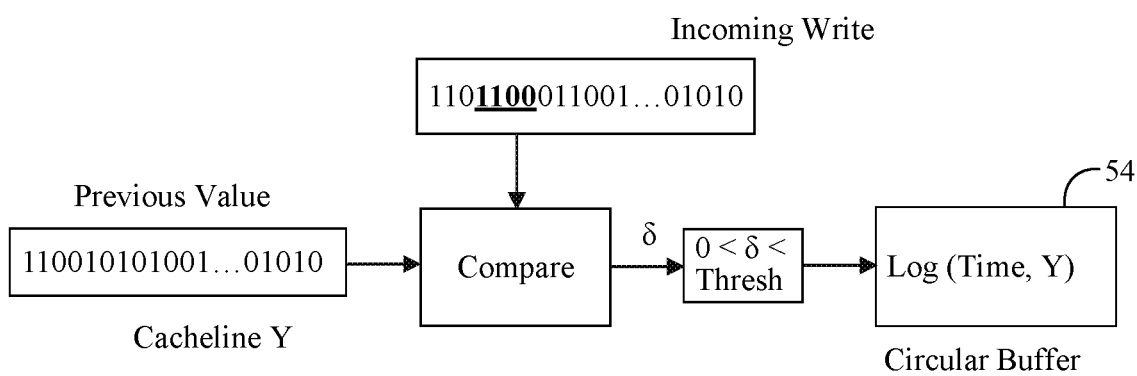

Turning now to FIGS. 5A to 5B, an embodiment of an electronic processing system 50 may include a first circular buffer 52 and a second circular buffer 54. In addition to the improved operations in the media controller, some embodiments may provide synergistic feedback that corresponds to the silent store identification. For example, a NVM controller may record those clock durations and data addresses that may be good prospects for software optimized silent store elimination and/or for undertaking data layout changes to reduce amplification of stores into media blocks. Some embodiments may deliver the silent store information to software via an appropriate tool/library/daemon. Appropriately utilized, the delivered silent store information may advantageously further improve performance, power, and/or endurance of volatile and/or nonvolatile memory media.

In some embodiments, the first circular buffer 52 may capture a time based revolving log of addresses for non-modifying stores. For example, the first circular buffer 52 may sample and generate optimization feedback to identify high opportunities for store suppression (e.g., with CMOV). The second circular buffer 54 may capture a time based revolving log of stores that cause significant NVM churn for less significant actual data change. Some embodiments may provide information (e.g., counts) that provides the user a view into the time and address range of when the silent stores occur. For example, such information may be captured in the first circular buffer 52. Such information may be used to optimize software (e.g., to precisely replace unconditional with conditional moves). Some embodiments may provide information (e.g., counts) that lets the user measure the number of bytes that have actually changed along with the number of bytes that were actually modified. For example, such information may be captured in the second circular buffer 54 and may be sampled so that either a compiler, a binary translator, a developer, etc. may optimize data layouts to reduce the number of actual NVM blocks that have to be written or moved as a consequence of the writes.

Some embodiments may provide profiling support to direct the user/developer to filter out silent stores by identifying where the silent stores are occurring. Advantageously, based on the silent store information reported by some embodiments, software may be improved or optimized by removing the silent stores altogether and thereby reducing the software's need for cache and memory bandwidth. Appropriately updated software may cause fewer cache invalidations and thus less trashing in the cache hierarchy. Even for a system with no NVM (e.g., a purely DRAM system), the system may benefit from reducing the number of silent stores by optimizing software based on silent store information reported in accordance with some embodiments.

Figure 6:
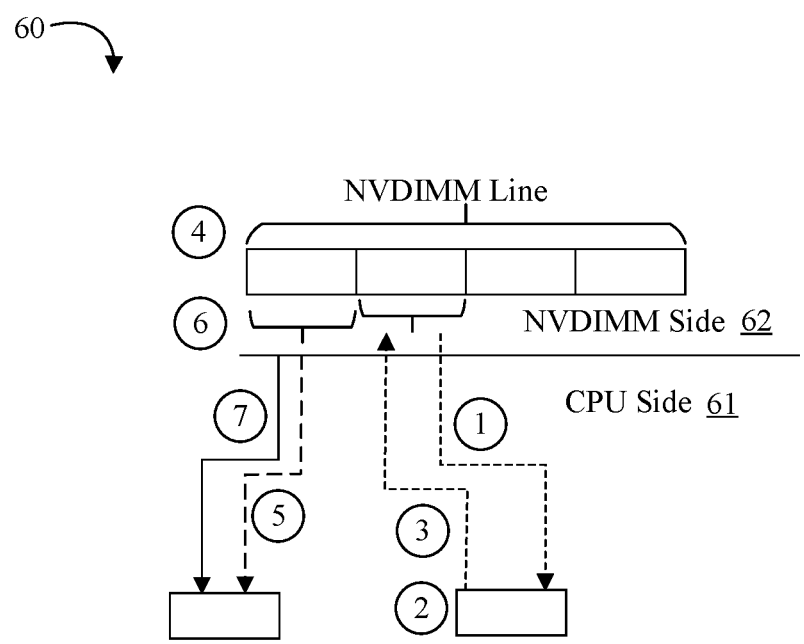
FIG. 6 is a block diagram of another example of an electronic processing system according to an embodiment.

Turning now to FIG. 6, an embodiment of an electronic processing system 60 may include a CPU side 61 and a NVDIMM side 62. In some other systems, silent stores may cause or contribute to a potential write lockout condition. At number 1, for example, the CPU side 61 may read a cacheline. At number 2, the CPU side may modify the cacheline contents. At number 3, the CPU side may write back the cacheline to the NVDIMM side. At number 4, the NVDIMM side may lock the NVDIMM line until completion. At number 5, a second access may be locked out (e.g., for a non-trivial interval). At number 6, the write may be completed and the NVDIMM line may be unlocked. At number 7, the second access may complete. By suppressing silent stores at number 4, some embodiments may advantageously avoid some write-lockout problems.

ADDITIONAL NOTES AND EXAMPLES

Example 1 may include an electronic processing system, comprising memory, and a memory controller communicatively coupled to the memory, the memory controller including logic to determine if a memory operation on the memory is avoidable, and suppress the memory operation if the memory operation is determined to be avoidable.

Example 2 may include the system of Example 1, wherein the logic is further to determine if the memory operation is avoidable based on whether a write operation modifies a content of the memory.

Example 3 may include the system of Example 1, wherein the logic is further to read an original content of a cacheline from the memory, in response to a request for a cacheline write operation, compare the original content against a current content of the cacheline, and suppress the cacheline write operation if the original content matches the current content.

Example 4 may include the system of Example 1, wherein the logic is further to collect information related to silent store operations, and report the information related to silent store operations.

Example 5 may include the system of Example 4, wherein the logic is further to record clock durations and data addresses corresponding to silent store operations.

Example 6 may include the system of any of Examples 1 to 5, wherein the memory comprises nonvolatile memory.

Example 7 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to determine if a memory operation on a memory is avoidable, and suppress the memory operation if the memory operation is determined to be avoidable.

Example 8 may include the apparatus of Example 7, wherein the logic is further to determine if the memory operation is avoidable based on whether a write operation modifies a content of the memory.

Example 9 may include the apparatus of Example 7, wherein the logic is further to read an original content of a cacheline from the memory, in response to a request for a cacheline write operation, compare the original content against a current content of the cacheline, and suppress the cacheline write operation if the original content matches the current content.

Example 10 may include the apparatus of Example 7, wherein the logic is further to collect information related to silent store operations, and report the information related to silent store operations.

Example 11 may include the apparatus of Example 10, wherein the logic is further to record clock durations and data addresses corresponding to silent store operations.

Example 12 may include the apparatus of any of Examples 7 to 11, wherein the memory comprises nonvolatile memory.

Example 13 may include the apparatus of any of Examples 7 to 12, wherein the logic coupled to the one or more substrates includes transistor channel regions that are positioned within the one or more substrates.

Example 14 may include a method of controlling memory, comprising determining if a memory operation on a memory is avoidable, and suppressing the memory operation if the memory operation is determined to be avoidable.

Example 15 may include the method of Example 14, further comprising determining if the memory operation is avoidable based on whether a write operation modifies a content of the memory.

Example 16 may include the method of Example 14, further comprising reading an original content of a cacheline from the memory, in response to a request for a cacheline write operation, comparing the original content against a current content of the cacheline, and suppressing the cacheline write operation if the original content matches the current content.

Example 17 may include the method of Example 14, further comprising collecting information related to silent store operations, and reporting the information related to silent store operations.

Example 18 may include the method of Example 17, further comprising recording clock durations and data addresses corresponding to silent store operations.

Example 19 may include the method of any of Examples 14 to 18, wherein the memory comprises nonvolatile memory.

Example 20 may include at least one computer readable storage medium, comprising a set of instructions, which when executed by a computing device, cause the computing device to determine if a memory operation on a memory is avoidable, and suppress the memory operation if the memory operation is determined to be avoidable.

Example 21 may include the at least one computer readable storage medium of Example 20, comprising a further set of instructions, which when executed by the computing device, cause the computing device to determine if the memory operation is avoidable based on whether a write operation modifies a content of the memory.

Example 22 may include the at least one computer readable storage medium of Example 20, comprising a further set of instructions, which when executed by the computing device, cause the computing device to read an original content of a cacheline from the memory, in response to a request for a cacheline write operation, compare the original content against a current content of the cacheline, and suppress the cacheline write operation if the original content matches the current content.

Example 23 may include the at least one computer readable storage medium of Example 20, comprising a further set of instructions, which when executed by the computing device, cause the computing device to collect information related to silent store operations, and report the information related to silent store operations.

Example 24 may include the at least one computer readable storage medium of Example 23, comprising a further set of instructions, which when executed by the computing device, cause the computing device to record clock durations and data addresses corresponding to silent store operations.

Example 25 may include the at least one computer readable storage medium of any of Examples 20 to 24, wherein the memory comprises nonvolatile memory.

Example 26 may include a memory controller apparatus, comprising means for determining if a memory operation on a memory is avoidable, and means for suppressing the memory operation if the memory operation is determined to be avoidable.

Example 27 may include the apparatus of Example 26, further comprising means for determining if the memory operation is avoidable based on whether a write operation modifies a content of the memory.

Example 28 may include the apparatus of Example 26, further comprising means for reading an original content of a cacheline from the memory, in response to a request for a cacheline write operation, means for comparing the original content against a current content of the cacheline, and means for suppressing the cacheline write operation if the original content matches the current content.

Example 29 may include the apparatus of Example 26, further comprising means for collecting information related to silent store operations, and means for reporting the information related to silent store operations.

Example 30 may include the apparatus of Example 29, further comprising means for recording clock durations and data addresses corresponding to silent store operations.

Example 31 may include the apparatus of any of Examples 26 to 30, wherein the memory comprises nonvolatile memory.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   memory; and
   a memory controller communicatively coupled to the memory, the memory controller including logic to:
   determine if a memory operation on the memory is avoidable,
   suppress the memory operation if the memory operation is determined to be avoidable,
   in response to one or more silent store operations, collect information related to the one or more silent store operations comprising collection of a clock duration and a data address related to the one or more silent store operations, and
   report the information related to the one or more silent store operations comprising storage of the clock duration and the data address related to the one or more silent store operations.

2. The system of claim 1, wherein the logic is further to:
   determine if the memory operation is avoidable based on whether a write operation modifies a content of the memory.

3. The system of claim 1, wherein the logic is further to:
   read an original content of a cacheline from the memory, in response to a request for a cacheline write operation;
   compare the original content against a current content of the cacheline; and
   suppress the cacheline write operation if the original content matches the current content.

4. The system of claim 1, wherein the logic is further to:
   record clock durations and data addresses corresponding to silent store operations.

5. The system of claim 1, wherein the silent store operations are associated with a nonvolatile type memory, wherein the nonvolatile type memory does not require power to maintain a state of data stored.

6. A semiconductor apparatus, comprising:
   one or more substrates; and
   logic coupled to the one or more substrates, wherein the logic is at least partly implemented in one or more of configurable logic and fixed-functionality hardware logic, the logic coupled to the one or more substrates to:
   determine if a memory operation on a memory is avoidable,
   suppress the memory operation if the memory operation is determined to be avoidable,
   in response to one or more silent store operations, collect information related to the one or more silent store operations comprising collection of a clock duration and a data address related to the one or more silent store operations, and
   report the information related to the one or more silent store operations comprising storage of the clock duration and the data address related to the one or more silent store operations.

7. The apparatus of claim 6, wherein the logic is further to:
   determine if the memory operation is avoidable based on whether a write operation modifies a content of the memory.

8. The apparatus of claim 6, wherein the logic is further to:
   read an original content of a cacheline from the memory, in response to a request for a cacheline write operation;
   compare the original content against a current content of the cacheline; and
   suppress the cacheline write operation if the original content matches the current content.

9. The apparatus of claim 6, wherein the logic is further to:
   record clock durations and data addresses corresponding to silent store operations.

10. The apparatus of claim 6, wherein the silent store operations are associated with a nonvolatile type memory.

11. The apparatus of claim 6, wherein the logic coupled to the one or more substrates includes transistor channel regions that are positioned within the one or more substrates.

12. At least one computer readable storage medium, comprising a set of instructions, which when executed by a computing device, cause the computing device to:
determine if a memory operation on a memory is avoidable;
suppress the memory operation if the memory operation is determined to be avoidable;
in response to one or more silent store operations, collect information related to the one or more silent store operations comprising collection of a clock duration and a data address related to the one or more silent store operations; and
report the information related to the one or more silent store operations comprising storage of the clock duration and the data address related to the one or more silent store operations.

13. The at least one computer readable storage medium of claim 12, comprising a further set of instructions, which when executed by the computing device, cause the computing device to:
determine if the memory operation is avoidable based on whether a write operation modifies a content of the memory.

14. The at least one computer readable storage medium of claim 12, comprising a further set of instructions, which when executed by the computing device, cause the computing device to:
read an original content of a cacheline from the memory, in response to a request for a cacheline write operation;
compare the original content against a current content of the cacheline; and
suppress the cacheline write operation if the original content matches the current content.

15. The at least one computer readable storage medium of claim 12, comprising a further set of instructions, which when executed by the computing device, cause the computing device to:
record clock durations and data addresses corresponding to silent store operations.

16. The at least one computer readable storage medium of claim 12, wherein the silent store operations are associated with a nonvolatile type memory.

17. A method of controlling memory, comprising:
determining if a memory operation on a memory is avoidable;
suppressing the memory operation if the memory operation is determined to be avoidable;
in response to one or more silent store operations, collecting information related to the one or more silent store operations comprising collection of a clock duration and a data address related to the one or more silent store operations; and
reporting the information related to the one or more silent store operations comprising storing the clock duration and the data address related to the one or more silent store operations.

* * * * *